United States Patent
Jia

(10) Patent No.: US 12,205,497 B2
(45) Date of Patent: Jan. 21, 2025

(54) FLEXIBLE DISPLAY PANEL AND CURVED DISPLAY SCREEN

(71) Applicant: Bazhou Yungu Electronics Technology Co., Ltd., Hebei (CN)

(72) Inventor: Dongwang Jia, Hebei (CN)

(73) Assignee: Bazhou Yungu Electronics Technology Co., Ltd., Langfang (CN)

(*) Notice: Subject to any disclaimer, the term of this patent is extended or adjusted under 35 U.S.C. 154(b) by 557 days.

(21) Appl. No.: 17/552,024

(22) Filed: Dec. 15, 2021

(65) Prior Publication Data

US 2022/0108636 A1    Apr. 7, 2022

Related U.S. Application Data

(63) Continuation of application No. PCT/CN2020/125880, filed on Nov. 2, 2020.

(30) Foreign Application Priority Data

Dec. 23, 2019    (CN) .......................... 201922334559.9

(51) Int. Cl.
G06F 1/16        (2006.01)
G09F 9/30        (2006.01)

(52) U.S. Cl.
CPC ..................................... *G09F 9/301* (2013.01)

(58) Field of Classification Search
None
See application file for complete search history.

(56) References Cited

U.S. PATENT DOCUMENTS

| | | | |
|---|---|---|---|
| 10,074,701 B2 | 9/2018 | Jeong et al. | |
| 11,441,054 B2* | 9/2022 | Kishimoto | G06F 1/1652 |
| 11,606,867 B2* | 3/2023 | Yu | H05K 5/0021 |
| 11,691,383 B2* | 7/2023 | Jeong | B32B 17/10 |
| | | | 359/507 |

(Continued)

FOREIGN PATENT DOCUMENTS

| | | |
|---|---|---|
| CN | 106505089 A | 3/2017 |
| CN | 106775062 A | 5/2017 |

(Continued)

OTHER PUBLICATIONS

PCT International Search Report for International Application No. PCT/CN2020/122800 dated Jan. 21, 2021.

(Continued)

*Primary Examiner* — Imani N Hayman
*Assistant Examiner* — Rashen E Morrison
(74) *Attorney, Agent, or Firm* — Rimon PC

(57) ABSTRACT

A flexible display panel and a curved display screen are provided. The flexible display panel includes a display region and a border region adjacent to each other and arranged along a first direction, the border region includes a chip region and a bend region, the bend region is located between the display region and the chip region, and the flexible display panel includes: a substrate; a base material reacting layer located on the substrate in the bend region; and a circuit wiring, located in the base material reacting layer, and obtained by at least a predetermined part of the base material reacting layer reacted by an oxidation reduction reaction.

19 Claims, 5 Drawing Sheets

(56) References Cited

U.S. PATENT DOCUMENTS

| | | | |
|---|---|---|---|
| 11,775,121 B2* | 10/2023 | Shin | G06F 3/044 |
| | | | 361/749 |
| 11,825,681 B2* | 11/2023 | Zhang | H10K 59/8722 |
| 2015/0255519 A1* | 9/2015 | Lee | H10K 50/826 |
| | | | 345/207 |
| 2016/0212887 A1* | 7/2016 | Nikkhoo | H05K 7/20418 |
| 2017/0243927 A1* | 8/2017 | Jeong | H10K 59/131 |

FOREIGN PATENT DOCUMENTS

| | | |
|---|---|---|
| CN | 107180852 A | 9/2017 |
| CN | 107275379 A | 10/2017 |
| CN | 207184926 U | 4/2018 |
| CN | 207690038 U | 8/2018 |
| CN | 108874203 A | 11/2018 |
| CN | 109411149 A | 3/2019 |
| CN | 109493745 A | 3/2019 |
| CN | 109614005 A | 4/2019 |
| CN | 109727539 A | 5/2019 |
| CN | 110111684 A | 8/2019 |
| CN | 209199067 U | 8/2019 |
| CN | 110335545 A | 10/2019 |
| CN | 110473474 A | 11/2019 |
| CN | 110581157 A | 12/2019 |
| CN | 111128022 A | 5/2020 |
| CN | 210836905 U | 6/2020 |
| JP | 2017020944 A | 1/2017 |
| WO | 2015109601 A1 | 7/2015 |

OTHER PUBLICATIONS

PCT Written opinion for International Application No. PCT/CN2020/122800 dated Jan. 21, 2021.

Chinese First Office Action for CN Application No. 201911350603.3 dated Dec. 30, 2020.

PCT International Search Report for International Application No. PCT/CN2020/125880 dated Jan. 27, 2021.

PCT Written opinion for International Application No. PCT/CN2020/125880 dated Jan. 27, 2021.

* cited by examiner

FLEXIBLE DISPLAY PANEL AND CURVED DISPLAY SCREEN

CROSS-REFERENCE TO RELATED APPLICATIONS

This application is a continuation of International Application No. PCT/CN2020/125880 filed on Nov. 2, 2020, which claims priority to Chinese patent application No. 201922334559.9, filed on Dec. 23, 2019. Both applications are incorporated herein by reference in their entireties.

TECHNICAL FIELD

The present invention relates to the field of flexible display technologies, and in particular to a flexible display panel and a curved display screen.

BACKGROUND

With the development of the information society, the flexible display panel has been more and more widely used in display devices. Because of the excellent flexibility of the flexible display panel, a narrow border can be realized through the way of bending or folding the edge region of the flexible display panel and disposing the edge region of the flexible display panel under the display screen.

However, due to the fact that the bend region usually has a film structure formed by stacking a plurality of films, the films may be easily separated when bending, and the metal wire in the bend region may be easily broken in the bending process, which resulting in a relatively low reliability of the display screen.

SUMMARY

In view of this, the embodiment of the present application provide a flexible display panel and a curved display screen to solve the problem of film layer separation or metal wire breaking in the bend region of the flexible display panel.

In a first aspect, the present application provides a flexible display panel. The flexible display panel includes a display region and a border region adjacent to each other and arranged along a first direction; the border region includes a chip region and a bend region, the bend region is located between the display region and the chip region. In a second direction perpendicular to the first direction, the flexible display panel includes: a substrate; a base material reacting layer located on the substrate in the bend region; and a circuit wiring, which is located in the base material reacting layer and obtained by at least a predetermined part of the base material reacting layer reacted by an oxidation reduction reaction.

In the flexible display panel according to an embodiment of the present application, the circuit wiring is formed by at least a predetermined part of the base material reacting layer reacted by an oxidation reduction reaction. The circuit wiring and the base material reacting layer are connected through Vander Waals force. In this way, on one hand, the adhesion is reinforced and the risk of the circuit wiring separating from the film layer beneath the circuit wiring is reduced; and on another hand, the stress created during the bending process can be counteracted and the risk of the breakage of the circuit wiring can be reduced.

In a second aspect, the present application provides a curved display screen, the curved display screen includes the flexible display panel according to any one of the embodiments mentioned above.

The curved display screen provided according to the present application has a corresponding technical effect with the flexible display panels provided by any one of the above embodiments.

DESCRIPTION OF EMBODIMENTS

The technical solutions in the embodiments of the present disclosure will be clearly and completely described with reference to the accompanying drawings in the present disclosure. It is evident that the embodiments described are only some rather than all embodiments in the present disclosure. Based on the embodiments of the present disclosure, all other embodiments obtained by those of ordinary skills in the art without any creative work shall fall within the protection scope of the present disclosure.

Figure 1A:
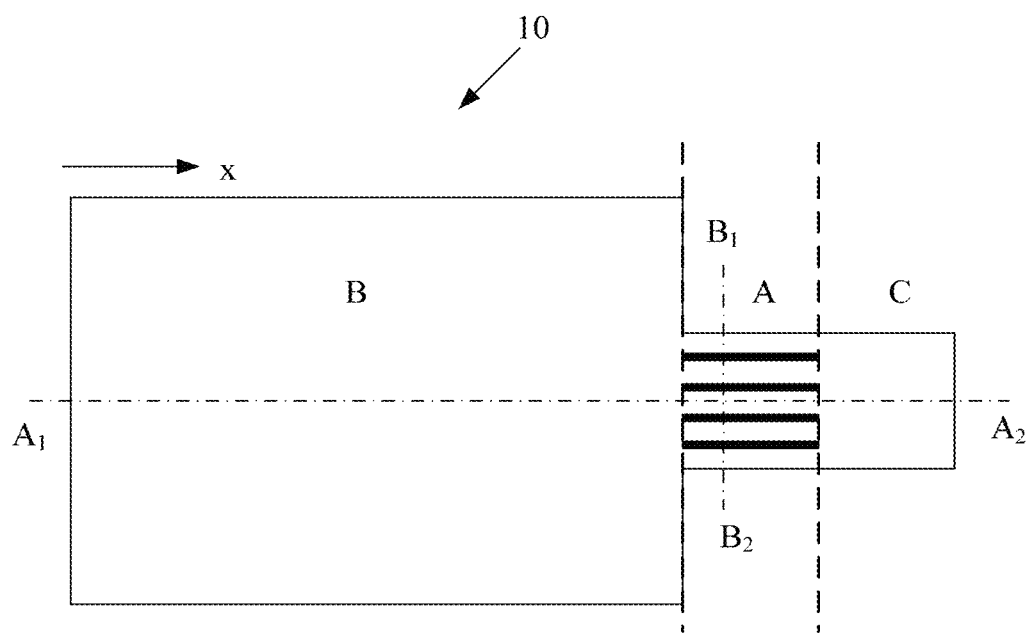
FIG. 1a is an overhead view diagram of a flexible display panel provided by an embodiment of the present application.
Figure 1B:
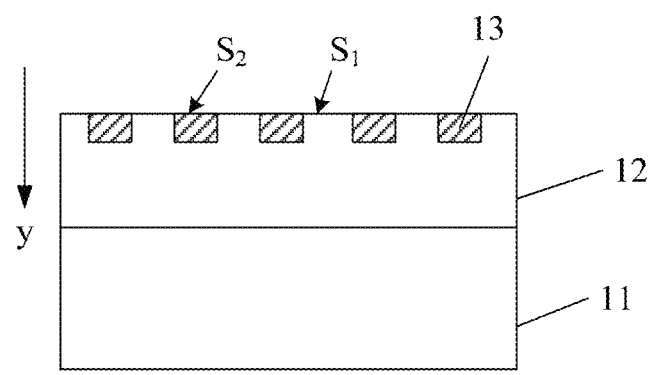
FIG. 1b is a partial cross-sectional diagram of the flexible display panel provided by an embodiment of the present application as shown in FIG. 1a along line B1B2.
Figure 1C:
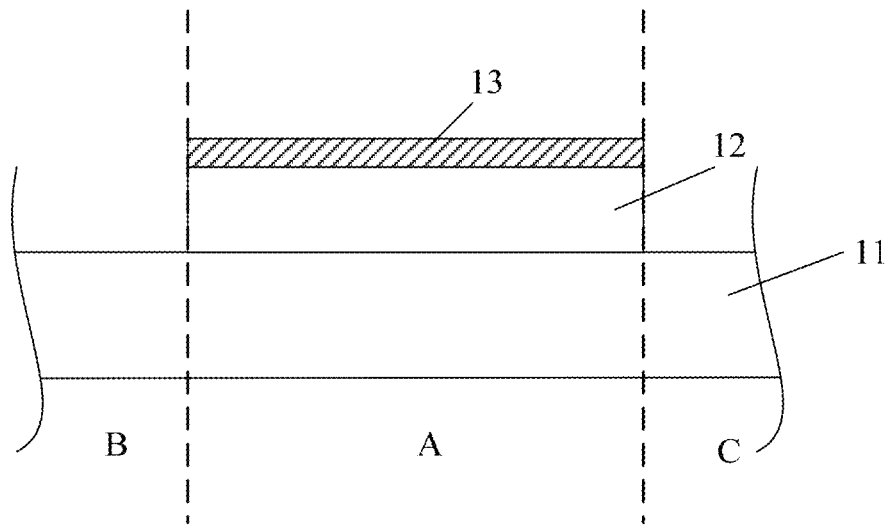
FIG. 1c is a partial cross-sectional diagram of the flexible display panel provided by a first embodiment of the present application as shown in FIG. 1a along line A1A2.

FIG. 1a is an overhead view diagram of a flexible display panel provided by an embodiment of the present application. FIG. 1b is a partial cross-sectional diagram of the flexible display panel provided by an embodiment of the present application as shown in FIG. 1a along line B1B2. FIG. 1c is a partial cross-sectional diagram of the flexible display panel provided by a first embodiment of the present application as shown in FIG. 1a along line A1A2. As shown in FIG. 1a, FIG. 1b and FIG. 1c, in a first direction x from region B to region C as shown in FIG. 1a, a flexible display panel 10 includes a display region B and a border region adjacent to each other; the border region includes a chip region C and a bend region A, and the bend region A is located between the display region B and the chip region C. In a second direction y perpendicular to the flexible display panel and the first direction x, the flexible display panel 10 includes a substrate 11, a base material reacting layer 12 and a circuit wiring 13. The base material reacting layer 12 is located on the substrate 11 in the bend region A, and the circuit wiring 13 is located in the base material reacting layer 12 and obtained by at least a predetermined part of the base material reacting layer 12 reacted by an oxidation reduction reaction.

The material of the substrate 11 can be any one of glass, metal, quartz and organic matter. In one of a preferred embodiment, the substrate 11 is a polyimide (PI) film substrate.

The circuit wiring 13 refers to a trace having a function of conducting electric, such that the circuit wiring 13 can be used to form a functional device or as a signal transmission path.

In the flexible display panel provided by this embodiment, the circuit wiring 13 is obtained by a predetermined part of the base material reacting layer reacted by the oxidation reduction reaction. The circuit wiring 13 and the base material reacting layer 12 are connected together through Vander Waals force. In this way, on one hand, the adhesion between the circuit wiring 13 and the base material reacting layer 12 is reinforced and the risk of the circuit wiring 13 separating from the film beneath the circuit wiring 13 is reduced; and on another hand, the stress created during the bending process can be counteracted by Vander Waals force and the risk of the breakage of the circuit wiring can be reduced.

In an embodiment, material of the base material reacting layer 12 is oxide. In this situation, the base material reacting layer 12 can further play a buffer role, so that there is no need to dispose a buffer layer on the substrate 11, that is, compared with the flexible display panel in the related art, although the flexible display panel 10 in this embodiment additionally comprised a base material reacting layer 12, a thickness of the flexible display panel is not increased because there is no need to set a buffer layer, which meets the market demand of ultra-thin.

For example, the material of the base material reacting layer 12 is graphene oxide, correspondingly, the material of the circuit wiring 13 is graphene. In this situation, the circuit wiring 13 of graphene can be obtained by a positioning irradiation of a laser to the base material reacting layer 12 with a mask plate holding a predetermined circuit pattern. Using graphene as a circuit wiring 13 can further reduce the risk of wire breakage due to its excellent electrical conductivity and flexibility.

As shown in FIG. 1b, in this embodiment, the base material reacting layer 12 includes a first surface $S_1$ away from the substrate 11, and the circuit wiring 13 includes a second surface $S_2$ not covered by the base material reacting layer. The second surface $S_2$ is flush with the first surface $S_1$, that is, the first surface $S_1$ and the second surface $S_2$ are coplanar. In this way, it is equivalent to choosing the top layer of the base material reacting layer 12 to prepare the circuit wiring 13. Compared with choosing the middle layer of the base material reacting layer 12 or the bottom layer adjacent to the substrate 11 to prepare the circuit wiring 13, the preparation process is simpler and the realization in industry is more conducive.

Figure 2:
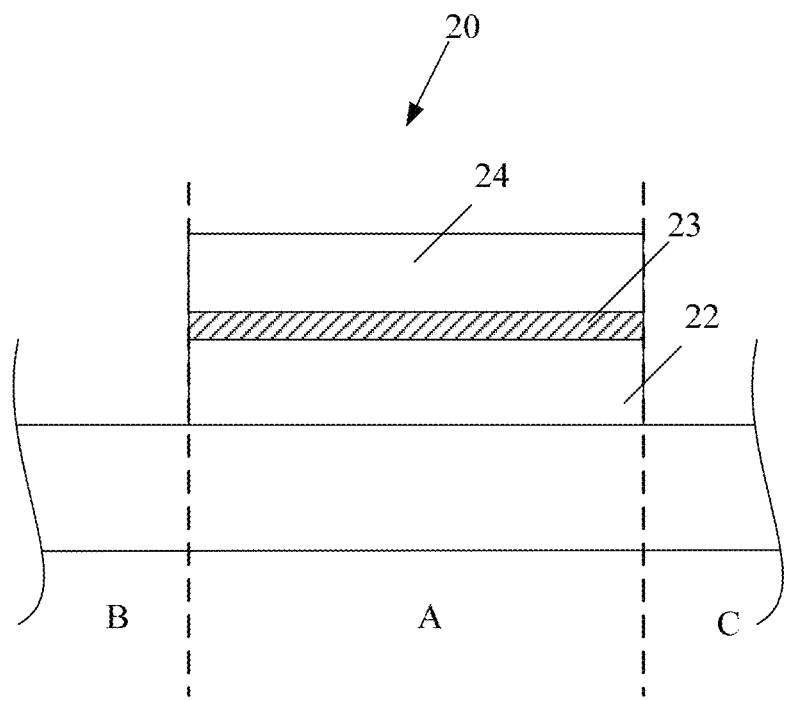
FIG. 2 is a partial cross-sectional diagram of the flexible display panel provided by a second embodiment of the present application as shown in FIG. 1a along line A1A2.

FIG. 2 is a partial cross-sectional diagram of the flexible display panel provided by a second embodiment of the present application as shown in FIG. 1a along line A1A2. Compared with the flexible display panel 10 shown in FIG. 1c, the only difference is that the flexible display panel 20 shown in FIG. 2 further includes a protective layer 24 covering the first surface $S_1$ and the second surface $S_2$. The material of the protective layer 24 and the material of the base material reacting layer 22 are the same.

The material of the protective layer 24 and the material of the base material reacting layer 22 are the same, which means the physical property of the protective layer 24 and the physical property of the base material reacting layer 22 are the same. In this case, compared with the adjacent films with different physical properties, the adjacent films with the same physical property have better adhesion, so that film separation is not easy to occur between the protective layer 24 and the base material reacting layer 22. Therefore, the risk of film separation between the circuit wiring 23 and the protective layer 24 above the circuit wiring 23 is reduced.

In an embodiment, the material of the protective layer 24 is oxide. In this situation, the protective layer 24 can also play an insulation role, so there is no need to set an insulating layer on the circuit wiring 23, that is, compared with the flexible display panel in the prior art, although the flexible display panel in this embodiment additionally comprises a protective layer 24, a thickness of the flexible display panel is not increased because there is no need to dispose an insulating layer, which meets the market demand of ultra-thin.

Figure 3:
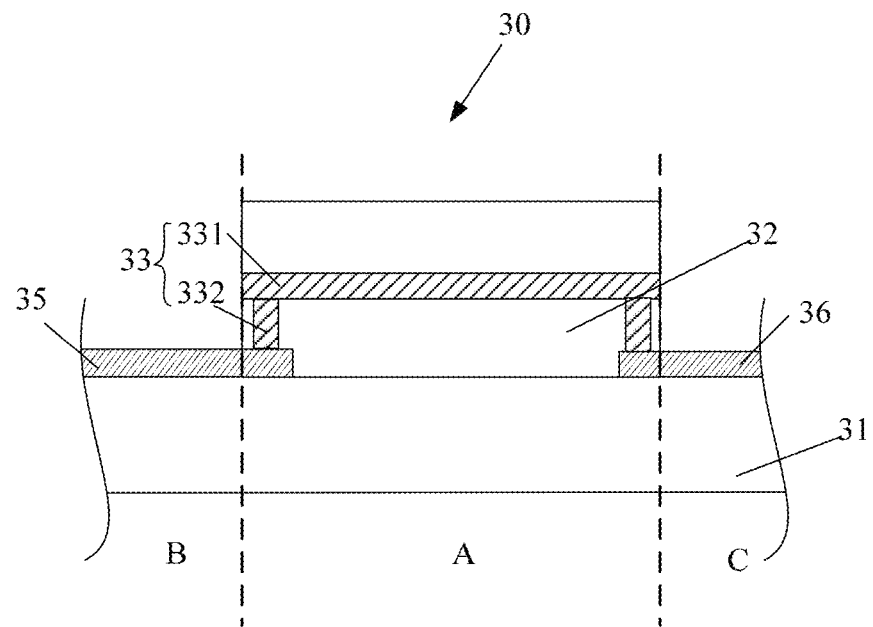
FIG. 3 is a partial cross-sectional diagram of the flexible display panel provided by a third embodiment of the present application as shown in FIG. 1a along line A1A2.

FIG. 3 is a partial cross-sectional diagram of the flexible display panel provided by a third embodiment of the present application as shown in FIG. 1a along line A1A2. Compared with the flexible display panel 20 shown in FIG. 2, the difference is that a circuit wiring 33 of a flexible display panel 30 shown in FIG. 3. 333 includes a connecting segment 331 and a lead-out segment 332 electrically connected to the connecting segment 331. The connecting segment 331 is parallel to the substrate 31, and the lead-out segment 332 is perpendicular to the substrate 31.

The connecting segment 331 of the circuit wiring 33 is used as a current path, and the lead-out segment 332 is used to electrically connect the circuit wiring 33 with other circuit structures and plays a role as a wiring terminal.

In the flexible display panel 30 provided by this embodiment, the wiring terminal (that is, the lead-out segment 332) of the circuit wiring 33 is also obtained by a predetermined part of the base material reacting layer 32 reacted by the oxidation reduction reaction. In this way, compared with the prior art of etching the hole and then filling the hole with metal to get the wiring terminal, on one hand, the preparation process is greatly simplified; and on another hand, the film separation is not easy to occur because of the more powerful bonding force between the lead-out segment 332 and the base material reacting layer 32 around the lead-out segment 332.

As shown in FIG. 3, the flexible display panel 30 includes at least one pixel drive circuit 35 in the display region B and at least one drive chip 36 in the chip region C. The lead-out segment 332 includes a first lead-out wire and a second lead-out wire, the first lead-out wire is connected to the pixel drive circuit 35, and the second lead-out wire is connected to the drive chip 36. FIG. 3 illustrates only a part of the pixel driver circuit 35 and a part of the drive chip 36, for example, showing a section of each lead-out wire respectively.

The drive chip 36 is used to output a drive signal. The drive signal is transmitted into the pixel drive circuit 35 through the circuit wiring 33. The pixel drive circuit 35 is charged under an action of the drive signal to control the corresponding sub-pixel light.

In the flexible display panel provided according to this embodiment, the bend region A is located between the display region B and the chip region C. In this situation, a narrow border is realized by fixing the chip region C of the flexible display panel in the non-display surface of the display region B through bending the bend region A.

At least one stress release structure may be disposed in the circuit wiring according to any one of the embodiments mentioned above, specifically, the connecting segment 331 comprises at least one stress release structure.

Figure 4A:
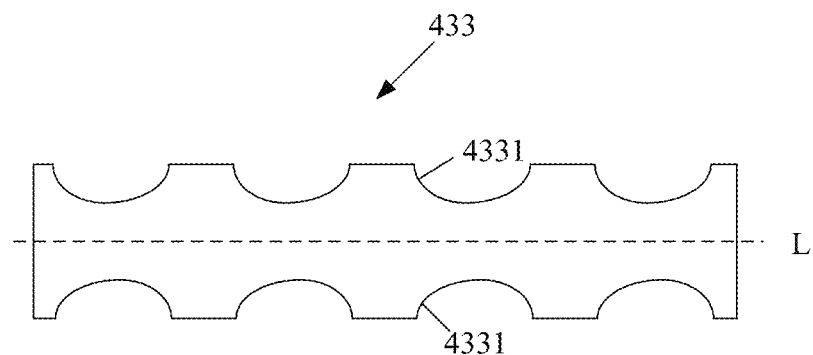
FIG. 4a is a partial overhead view diagram of a circuit wiring provided in the first embodiment of the present application.

For example, FIG. 4a is a partial overhead view of a circuit wiring provided in the first embodiment of the present application. As shown in FIG. 4a, in this embodiment, a connecting segment 433 of the circuit wiring includes a symmetry axis L parallel to an extending direction of the connecting segment 433 and two edge wires 4331 symmetric about the symmetry axis L. Each of the edge wires 4331 is a structure with a plurality of curves and a plurality of wiring segments connected alternatively. Specifically, as shown in FIG. 4a, the edge wires 4331 include plurality of semicircular curves, each two adjacent semicircular curves are connected through a wiring segment. In this way, compared with the circuit wiring having straight edge wires, a length of the edge wire is extended, the ability to disperse the bending stress is enhanced so as to further reduce the risk of circuit breakage.

Figure 4B:
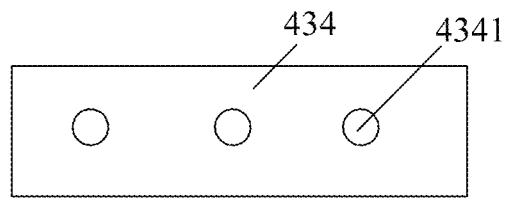
FIG. 4b is an overhead view diagram of a circuit wiring provided in the second embodiment of the present application.

For another example, FIG. 4b is an overhead view of a circuit wiring provided in the second embodiment of the present application. As shown in FIG. 4b, in this embodiment, the connecting segment 434 of the circuit wiring includes a through-hole 4341 running through the connecting segment 434 in a thickness direction of the connecting segment 434. In this way, stress can be released by the deformation of the through-hole during the bending of the connecting segment 434. The preparation process of the through-hole may include: shading the through-hole when preparing the circuit wiring, which means the oxidation reduction reaction is not carried out at the through-hole.

Figure 4C:
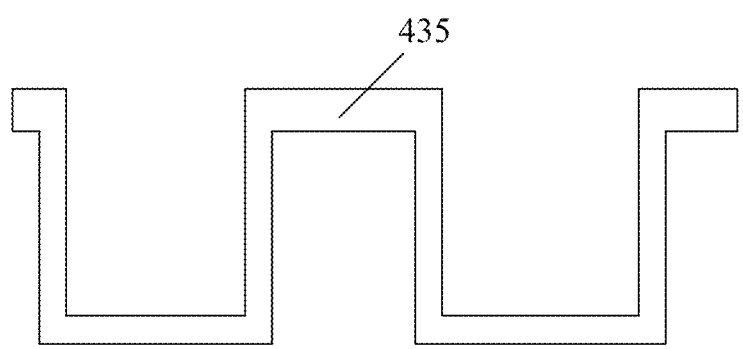
FIG. 4c is an overhead view diagram of a circuit wiring provided in the third embodiment of the present application.
Figure 4D:
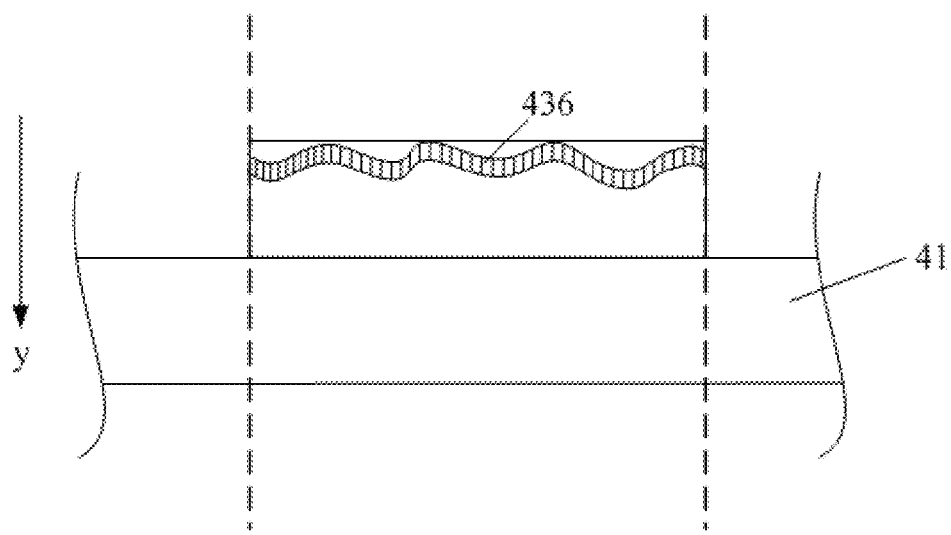
FIG. 4d is a cross-sectional diagram of a circuit wiring provided in the fourth embodiment of the present application.

For example, FIG. 4c is an overhead view diagram of a circuit wiring provided in the third embodiment of the present application, compared with the circuit wiring shown in FIG. 1c, the only difference is that, in a direction parallel the substrate 11, the shape of the connecting segment 435 of the circuit wiring shown in FIG. 4c is a serpentine curve, such as a square waveform or a wavy shape. FIG. 4d is a cross-sectional diagram of a circuit wiring provided in the fourth embodiment of the present application, compared with the circuit wiring in FIG. 1c, the only difference is that, in the second direction y perpendicular to the substrate 41, the connecting segment 436 of the circuit wiring shown in FIG. 4d is in a shape of curve.

In this way, the length of the circuit wiring is increased, and the ability to disperse the bending stress is enhanced, thus the breakage risk of the circuit wiring can be further reduced.

In addition, it should be noted that the circuit wiring in the bend region A cannot be designed as a curve in the prior art, due to the problems of film separation and wire broken existing in the prior art when obtaining the circuit wiring through etching the metal layer, the risks of film separation and wire broken will be further increased when the circuit wiring is in a curve shape as mentioned above. In this embodiment of the present application, the circuit wiring is obtained by a predetermined part of the base material reacting layer reacted by the oxidation reduction reaction, such that the adhesion between the circuit circuiting and its adjacent film layer is stronger, which reduce the risks of film separation and wire broken, therefore the circuit wiring in the bend region A can be designed in the curved shape as mentioned above.

Figure 5:
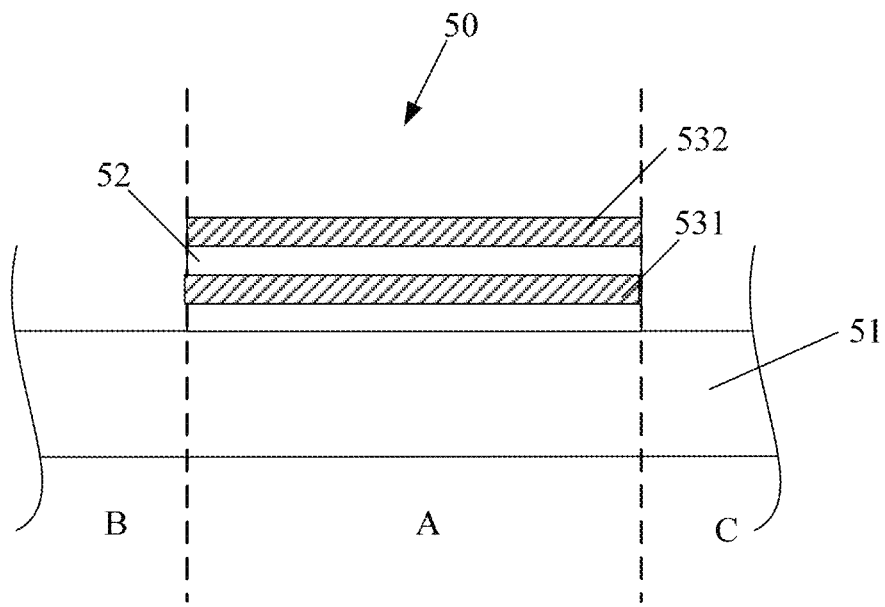
FIG. 5 is a partial cross-sectional diagram of the flexible display panel provided by a fourth embodiment of the present application as shown in FIG. 1a along line A1A2.

FIG. 5 is a partial cross-sectional diagram of the flexible display panel provided by a fourth embodiment of the present application as shown in FIG. 1a along line A1A2. As shown in FIG. 5, the base material reacting layer 52 includes a plurality of circuit sub-wirings arranged in a plurality of layers parallel to the substrate, and the orthographic projections of the plurality of circuit sub-wirings arranged in the plurality of layers on the substrate coincide with each other, that is, the orthographic projections of the plurality of circuit sub-wirings arranged in the plurality of layers on the substrate are overlapped.

For example, as shown in FIG. 5, the base material reacting layer 52 includes a first layer of circuit sub-wiring 531 and a second layer of circuit sub-wiring 532. The orthographic projection of the first layer of circuit sub-wiring 531 on the substrate 51 and the orthographic projection of the second layer of circuit sub-wiring 532 on the substrate 51 coincide with each other, that is, the orthographic projection of the first layer of circuit sub-wiring 531 on the substrate 51 and the orthographic projection of the second layer of circuit sub-wiring 532 on the substrate 51 are overlapped.

The area of the circuit wiring occupied on the surface which is parallel to the substrate 51 can be saved by disposing a plurality of circuit sub-wirings in a plurality of layers parallel to the substrate 51 in the base material reacting layer 52, which is beneficial to the requirements of product miniaturization.

Figure 6:
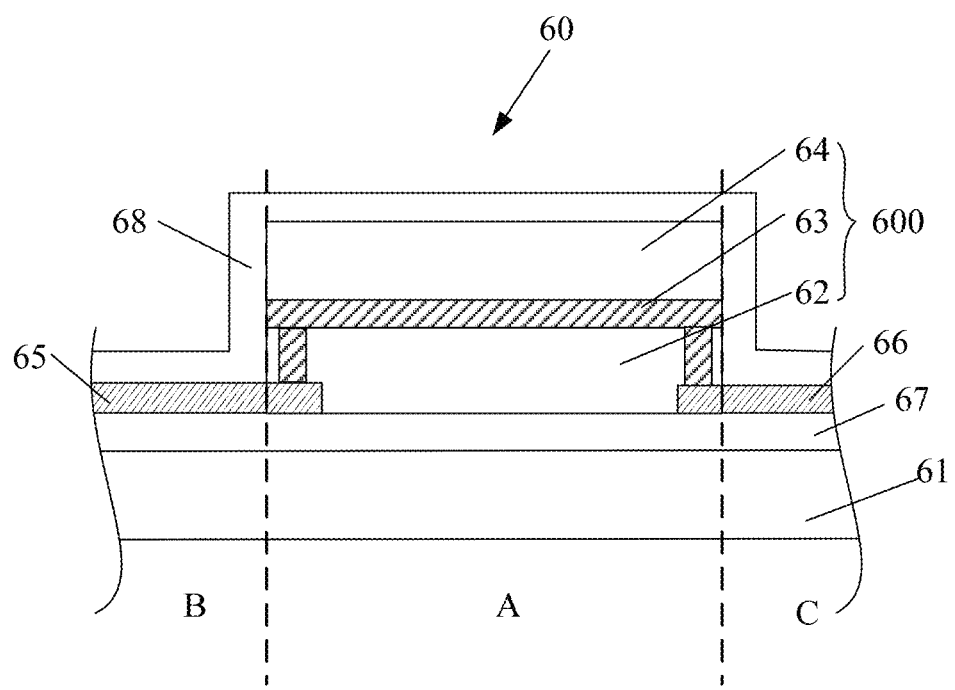
FIG. 6 is a partial cross-sectional diagram of the flexible display panel provided by a fifth embodiment of the present application as shown in FIG. 1a along line A1A2.

FIG. 6 is a partial cross-sectional diagram of the flexible display panel provided by a fifth embodiment of the present application as shown in FIG. 1a along line A1A2. As shown in FIG. 6, compared with the flexible display panel 30 shown in FIG. 3, the only difference is that the flexible display panel 60 shown in FIG. 6 further includes a buffer layer 67 located between a substrate 61 and a base material reacting layer 62; and/or the flexible display panel 60 shown in FIG. 6 further includes an insulating layer 68 located on a side of the base material reacting layer 62 away from the substrate 61.

Specifically, as shown in FIG. 6, the flexible display panel 60 includes the substrate 61, the buffer layer 67 stacked on the substrate 61, a structure of wiring 600, at least one pixel drive circuit 65 and at least one drive chip 66 stacked on the buffer layer 67, and the insulating layer 68 stacked on the structure of wiring 600, the at least one pixel drive circuit 65 and the at least one drive chip 66. The structure of wiring 600 includes the base material reacting layer 62, the circuit wiring 63 and a protection layer 64 are sequentially stacked from the top to the bottom.

The buffer layer 67 has a buffering effect. For example, the material of the buffer layer 67 can be, silicon nitride, silicon oxide, alumina or the like. The insulating layer 68 has an electrical isolation function, for example, the material of the insulating layer 68 can be silicon nitride, silicon oxide or the like.

The flexible display panel according to the present application can further improve the buffer effect through setting the buffer layer separately and can further improve the insulation effect through setting the insulating layer separately.

This embodiment further provides a curved display screen, the curved display screen includes the flexible display panels provided by any one of the embodiments mentioned above, and has the corresponding technical effect with the flexible display panel.

What described above are merely preferred embodiments of the present application, and are not to limit the present application, and any modification, equivalent and so on within the spirit and principles of the present application shall be covered in the protective scope of the present application.

What is claimed is:

1. A flexible display panel, comprising a display region and a border region adjacent to each other and arranged along a first direction, the border region comprising a chip region and a bend region, the bend region being located between the display region and the chip region, wherein in a second direction perpendicular to the first direction, the flexible display panel comprises:
   a substrate;
   a base material reacting layer located on the substrate in the bend region; and
   a circuit wiring located in the base material reacting layer and obtained by at least a predetermined part of the base material reacting layer reacted by an oxidation reduction reaction, wherein the circuit wiring comprises a connecting segment and a lead-out segment electrically connected to the connecting segment, the connecting segment comprises a symmetry axis and two edge wires, the symmetry axis is parallel to an extending direction of the connecting segment, the two edge wires are symmetrical about the symmetry axis, and each of the two edge wires is a structure with a plurality of curves and a plurality of wiring segments connected alternatively.

2. The flexible display panel according to claim 1, wherein the base material reacting layer comprises a first surface away from the substrate, the circuit wiring comprises a second surface which is flush with the first surface, the second surface is not covered by the base material reacting layer.

3. The flexible display panel according to claim 2, further comprising a protective layer covering the first surface and the second surface, wherein material of the protective layer is the same as material of the base material reacting layer.

4. The flexible display panel according to claim 1, wherein the connecting segment is parallel to the substrate, and the lead-out segment is perpendicular to the substrate.

5. The flexible display panel according to claim 4, further comprising at least one pixel drive circuit in the display region and at least one drive chip in the chip region,
   wherein the lead-out segment comprises a first lead-out wire and a second lead-out wire, the first lead-out wire is connected to the pixel drive circuit, and the second lead-out wire is connected to the drive chip.

6. The flexible display panel according to claim 4, wherein the connecting segment comprises at least one stress release structure.

7. The flexible display panel according to claim 4, wherein each of the two edge wires comprises a plurality of semicircular curves, and every two adjacent semicircular curves are connected through the wiring segment.

8. The flexible display panel according to claim 4, wherein the connecting segment comprises a through-hole running through the connecting segment in a thickness direction of the connecting segment.

9. The flexible display panel according to claim 4, wherein in a direction parallel to the substrate, the connecting segment is a curve.

10. The flexible display panel according to claim 4, wherein in a direction perpendicular to the substrate, the connecting segment is a curve.

11. The flexible display panel according to claim 1, wherein the circuit wiring comprises a plurality of circuit sub-wirings arranged in a plurality of layers parallel to the substrate, and orthographic projections of the plurality of circuit sub-wirings arranged in the plurality of layers on the substrate are overlapped.

12. The flexible display panel according to claim 1, further comprising a buffer layer located between the substrate and the base material reacting layer.

13. The flexible display panel according to claim 1, further comprising an insulating layer located on a side of the base material reacting layer away from the substrate.

14. The flexible display panel according to claim 1, wherein material of the base material reacting layer is oxide.

15. The flexible display panel according to claim 13, wherein the material of the base material reacting layer comprises graphene oxide; and
   material of the circuit wiring comprises graphene.

16. The flexible display panel according to claim 4, wherein the base material reacting layer comprises a first surface away from the substrate, the circuit wiring comprises a second surface which is flush with the first surface, the second surface is not covered by the base material reacting layer.

17. The flexible display panel according to claim 16, further comprising a protective layer covering the first surface and the second surface, wherein material of the protective layer is the same as material of the base material reacting layer.

18. The flexible display panel according to claim 17, wherein the material of the base material reacting layer comprises graphene oxide; and
   material of the circuit wiring comprises graphene.

19. A curved display screen, comprising the flexible display panel according to claim 1.

* * * * *